Figures 5, 6:
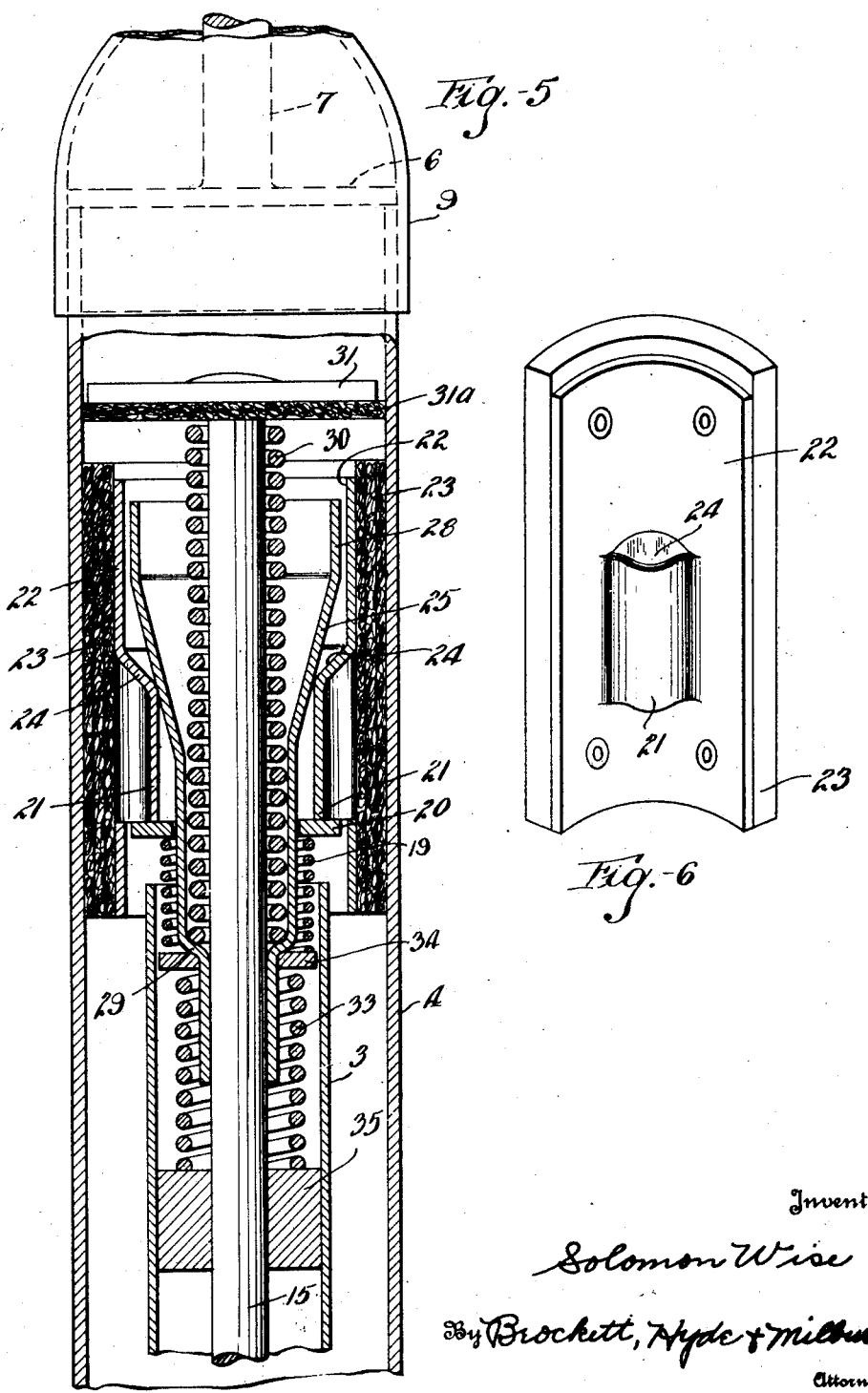

Oct. 30, 1928.
S. WISE
1,689,903
SNUBBER
Filed Dec. 3, 1923
2 Sheets-Sheet 1
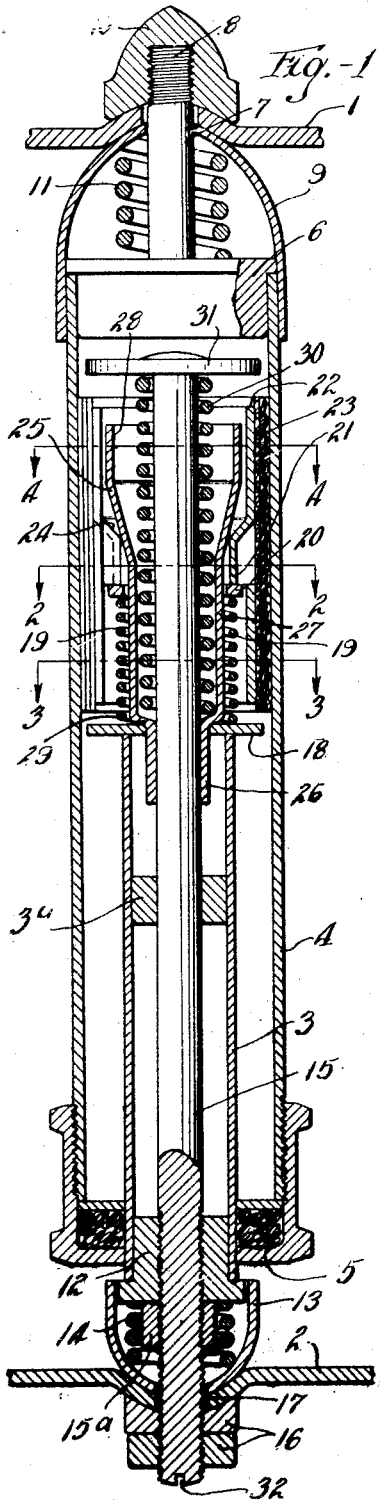
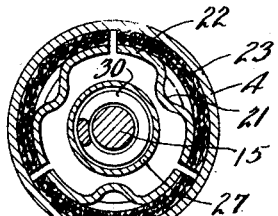
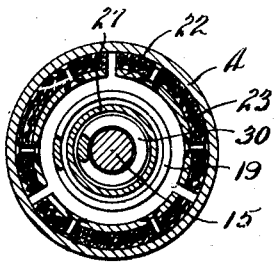
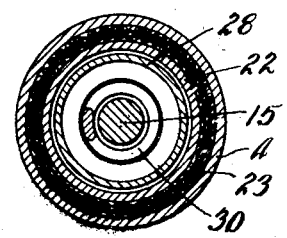
Inventor
Solomon Wise
By Brockett, Hyde & Milburn
Attorneys Oct. 30, 1928.

S. WISE 1,689,903

SNUBBER

Filed Dec. 3, 1923  2 Sheets-Sheet 2

Inventor
Solomon Wise
By Brockett, Hyde & Milburn
Attorneys

Patented Oct. 30, 1928.

1,689,903

UNITED STATES PATENT OFFICE.

SOLOMON WISE, OF CLEVELAND, OHIO.

SNUBBER.

Application filed December 3, 1923. Serial No. 678,274.

This invention relates to improvements in that class of devices known as "snubbers" for use on automobiles and the like for preventing rebound of the vehicle body. More particularly, the present invention is an improvement of that type of snubber which comprises two telescoping members secured respectively to the body frame of the vehicle and the axle, with friction shoes and a wedge member for effecting binding engagement so as to prevent re-bound of the vehicle body.

The objects of this invention are to provide a separate wedge means by which the friction shoes are forced into binding engagement with the outer telescoping member, the wedge member in the present case being centered about the stem which is secured to the lower telescoping member; furthermore to provide a separate hollow, metal wedge member, together with means for suitably supporting the wedge member; to provide, in one form of device, means for supporting the wedge member in floating arrangement between spiral springs, while in another form to support the wedge member directly upon the upper end of the lower telescoping member.

Another object of the invention is to provide means for adjusting the device so as to vary the action of the "snubber" according to existing conditions; and a still further object consists in providing means for limiting the movement of the wedge in its actuation of the friction shoes.

Another object is to provide means for limiting the movement of the friction shoes in one direction, and at the same time to utilize this same means for affording a seat for the wedge member upon the upper end of the lower telescoping member.

A further object is to provide an improved universal joint connection between the "snubber" at each end and the body frame so as to automatically accommodate itself to the sidewise movement of the vehicle body.

Other objects of the invention will appear from the following description and claims when considered together with the drawings.

Fig. 1 is a vertical section of one form of my improved device; Figs. 2, 3 and 4 are cross sections taken on lines 2—2, 3—3 and 4—4, respectively, of Fig. 1; Fig. 5 is a vertical section of another form of device; and Fig. 6 is a detail view of one of the friction shoes.

Any suitable means may be employed for securing the bracket arms 1 and 2 to the body frame and the axle of the vehicle, for which reason these parts are not here illustrated.

The present form of "snubber" as illustrated in both Figs. 1 and 5 comprises the inner and outer telescoping tubular members 3 and 4, between which there is provided for telescoping engagement the packing joint connection indicated by reference numeral 5. The upper end of the telescoping member 4 is closed by means of the plug 6 which is fixedly secured within the upper end thereof in any suitable manner as for instance by a pin or by crimping. This plug 6 is provided with the upwardly extending stem 7 which is screw threaded at its end portion 8. The crown or cap 9 extends down over the upper end portion of the tubular member 4 in telescoping arrangement therewith and has seated upon its upper end the apertured arm 1 of the supporting bracket which fits down over the stem 7. The acorn nut 10 is screwed down to full limit as a jam nut so as to secure these parts together, the under side of the nut being given a curvature corresponding to that of the bracket arm 1. In this manner there is provided a universal connection, the aperture in the arm 1 being sufficiently large to permit universal play, whereby the joint automatically accommodates itself to the side-wise movements of the body of the vehicle. Within the cap 9 there is provided the comparatively strong coil spring 11 which surrounds the stem 7 and has abutting engagement at its ends with the top of the plug 6 and the cap 9 so as to maintain the cap 9 and acorn nut 10 in proper position against bracket arm 1, automatically taking up wear but providing free universal movement. The cap 9 as well as the single acorn nut 10 together give also a neat appearance.

The lower end of the inner telescoping member 3 is closed by means of the flanged plug 12, the outer marginal portion of which is engaged by the crown cap 13 between which and the plug 12 there is arranged the comparatively strong coil spring 14 in the same manner and for the same purpose as described for the upper end of the "snubber". The jam nut 15ª serves as a means of locking the stem 15 in adjusted position, as will later appear. The stem 15, to which reference will later be made, has screw thread engagement through the plug 12 and extends through an aperture in the bottom of the cap 13 while the bracket arm 2 engages over the lower end of the stem 15 and is secured in position by means of the nuts 16. The aperture 17 in the arm 2 is sufficiently large to permit universal play at this point in the same manner as at the upper end of the "snubber", the lower portion of the cap 13 as well as the corresponding portion of the arm 15 and the inner nut 16 being suitably curved so as to afford such universal connection.

Referring first to the form shown in Fig. 1, it will be seen that there rests upon the upper end of the telescoping member 3 the washer 18 which supports the comparatively light coil spring 19. The spring 19 in turn supports the washer 20 which engages the inset lip extension 21 of the inner metal portion 22 of the friction shoes, these shoes being faced on their outside with any suitable friction material as for instance chrome leather or brake lining 23 secured to the metal 22 by means of sunken eyelets. Any suitable number of such shoes may be used, three being here illustrated, and in the present case the metal portions of the shoes are stamped out of sheet metal. The inwardly extending portions 21 are formed by shearing and pressing inwardly such sheared portions as more clearly illustrated in Figs. 6. With this arrangement the shoes are always supported in proper operative position by means of the spring 19 and the shoulder 24, provided on each shoe by the shearing and pressing operations, is as a result maintained in contact with the tapering wall 25 of the wedge member. This wedge member, which is adapted to force the shoes outwardly into binding engagement with the inner wall of the telescoping member 4, is here formed as a hollow metal member and is centered about the stem 15, with the reduced portion 26 in contact relation with the stem and with the larger portions 27 and 28 spaced from the stem these last two named portions being connected by the tapering wedge portion 25. Between the portions 26 and 27 of the wedge member there is provided the annular shoulder 29 which serves as a means of supporting the wedge member upon the seat provided by the washer 18 and serves also as an abutment or bearing means for the lower end of the coil spring 30, while the upper end of this spring abuts the washer 31 which is secured to the upper end of the stem 15 by having the extreme end portion thereof riveted over, or threaded thereto.

The lower end of the stem 15 is slotted as indicated at 32 so as to permit the application of a screw driver for turning the stem 15 in order to adjust the snubber to better suit existing conditions under which the "snubber" is used. Lock nut 15ª is provided to maintain this adjustment. It will be observed that such adjustment may be effected without disassembling any of the parts and it will be noted also that with a right hand thread on the lower end of the stem 15 the free action of the "snubber" is increased by turning the stem to the right as viewed in Fig. 1. Such manner of adjustment, as will be clear from the drawings, serves to relieve the spring 30 so as to permit the same to lengthen out and to increase the free space between the washer 31 and the upper ends of the friction shoes. In this connection it should be noted that in devising and designing the present form of invention it is desirable to maintain suitable free space between the upper ends of the friction shoes and the washer 31 so that the shoes and wedge do not operate when travelling over comparatively small ruts or bumps in the road. In Fig. 5, I have provided washer 31 with a leather facing 31ª which is adapted to be engaged by the projecting upper end portions of the leather facings 23 so as to constitute a cushioning means and to eliminate tapping noise when the shoes reach the extreme upper end of movement. Then by adjusting the stem 15 to the left as viewed in Fig. 1, the free space between the upper ends of the shoes and the washer 31 may be reduced, but the degree of binding action between the shoes and the telescoping member remains the same regardless of the length of free space. However, this device may be provided with means of adjustment in the manner described below so as to afford the proper degree of snubbing action for preventing rebound of the vehicle body according to the condition of the road over which the automobile is being driven. This may be accomplished by inserting a comparatively strong coil spring in the space between the fixed collar 3ª and washer 18 in the same arrangement and with the same manner of operation as described below for the form of device shown in Fig. 5.

The modified form of device illustrated on Sheet 2 of the drawings is very similar to that shown on Sheet 1 and except as herein pointed out has the same details of structure. It should be explained that the first form of device has been specially devised for use on certain light automobiles, as for instance the Ford, whereas the second form of device now to be referred to is better adapted for use upon a heavier car. In this case the wedge member is mounted in what might be termed a floating arrangement by virtue of the spring 30 engaging the shoulder 29 from above and the spring 33 of substantially the same grade but different length engaging the washer 34 on the underside of the shoulder 29 and abutting at its lower end the fixed collar 35 which has a drive fit in the inner telescoping member 3. The washer 34 serves also in the same manner as does the washer 18 in the first form as a means of supporting the spring 19 although in the second form this washer 34 is enclosed within the upper end portion of the telescoping member 3 which projects upwardly so as to partially surround the spring 19. With this second form of arrangement there is obtained a composite or combined action between the springs 30 and 33. In other words, upon adjusting the stem to the right the spring 30 will be permitted to lengthen out, with the result that its tension or pressure upon the shoulder 29 is somewhat relieved and consequently the spring 33 is likewise relieved. Such effect on the spring 33 is at the same time transmitted through the washer 34 to the spring 19. Then upon adjusting the stem 15 to the left, the spring 30 is compressed and likewise the spring 33 is also compressed. Thus the actual wedging pressure against the friction shoes is equal to the component force of the two springs 30 and 33 because plug 35 is a fixed member and the distance between plug 35 and washer 31ª can be increased or decreased at will since the two springs 30 and 33 are brought into play by adjusting stem 15.

By virtue of the so called floating wedge arrangement shown in the second form of device there is made possible a positive means of varying the friction or gripping action of the shoes; for example; by screwing the stem 15 in to the right the wedging pressure is increased, also the free space between top of the shoes and washer 31ª is increased. Conversely by screwing the stem 15 to the left the wedging pressure is decreased and the free space is also decreased.

Whereas in the first form of device such adjusting operation affects only the one spring 30 which bears against a fixed seat at its lower end, merely increasing or decreasing the free space between the top of the shoes and the top washer.

The operation briefly described is as follows:

Upon striking a hole in the road over which the automobile is being driven, the outer telescoping member will be lowered and will because of its frictional engagement with the shoes carry the same downwardly until their shoulders 24 move sufficiently inwardly along the cam face 25 to permit passage of the telescoping member 4 without carrying the shoes any further. The wedge is seated so as to prevent same from moving downward with shoes. From then on, the telescoping member is free to move alone downwardly and the shoes are at the same time maintained by means of the springs 19 in proper contact with respect to the wedge face 25 so as to be ready for immediate co-operation therewith to prevent rebound of the vehicle body. Such rebound is actually prevented upon upward movement of the outer telescoping member 4 as it would tend to drag with it the shoes which are immediately forced radially outwardly as soon as there is any tendency for the outer telescoping member to carry them upwardly. This radial movement of the shoes is, of course, caused by the engagement between the shoulders 24 and the wedge surface 25. Such binding engagement between the shoes and the outer telescoping member is supplemented by compression of spring 30. This spring action is caused by engagement of the shoulder 29 of the wedge with the spring 30, which is thereby compressed against the washer 31, and such movement will continue until limited by contact of the shoes with the washer on the upper end of the stem. The operation of both forms of device as here illustrated is the same except for the additional elements and their cooperation with the other parts as heretofore explained.

Having described my invention I claim:

1. A device of the character described, comprising telescoping members adapted for attachment to the axle and body frame respectively of a vehicle or the like, a stem carried by one of said members, means adapted for frictional binding engagement with the other of said members, and wedge means separate from the stem for automatically effecting operation of said frictional means so as to prevent rebound of the vehicle body.

2. A device of the character described, comprising telescoping means adapted for attachment to the axle and body frame respectively of a vehicle or the like, a stem carried by one of said members, a plurality of friction shoes adapted for binding engagement with the other of said members, and wedge means separate from said stem for automatically directing said shoes into binding engagement with said member so as to prevent rebound of the vehicle body.

3. A device of the character described, comprising telescoping members adapted for attachment to the axle and body frame respectively of a vehicle or the like, a stem carried by one of said members, means adapted for frictional binding engagement with the other of said members, and wedge means separate from and surrounding said stem for automatically effecting operation of said friction means so at to prevent rebound of the vehicle body.

4. A device of the character described, comprising telescoping members adapted for attachment to the axle and the body frame respectively of a vehicle or the like, a stem carried by one of said members, a plurality of frictional shoes adapted for binding engagement with the other of said members, wedge means for automatically directing said shoes into binding engagement with said member so as to prevent rebound of the vehicle body, and cushioning means for limiting the movement of said friction shoes.

5. A device of the character described, comprising telescoping means adapted for attachment to the axle and the body frame respectively of a vehicle or the like, means adapted for frictional binding engagement with a part of said telescoping means, means including a wedge for automatically effecting operation of said friction means so as to prevent rebound of the vehicle body, and springs co-operating with said wedge so as to constitute a floating arrangement therefor.

6. A device of the character described, comprising a telescoping means adapted for attachment to the axle and the body frame respectively of a vehicle or the like, means adapted for frictional binding engagement with a part of said telescoping means, means including a hollow wedge and springs arranged inside and outside of said wedge for co-operation therewith so as to constitute a floating arrangement therefor, said wedge being adapted to automatically effect operation of said friction means so as to prevent rebound of the vehicle body.

7. A device of the character described, comprising telescoping means adapted for attachment to the axle and the body frame respectively of a vehicle or the like, a stem carried by one of said members, means adapted for frictional binding engagement with the other of said members, wedge means separate from said stem and freely surrounding the same for actuation of said friction means and spring means having co-operative engagement with the inside and outside of said wedge means and also with said stem and the inner telescoping member, whereby said wedge means automatically effects operation of said friction means so as to prevent rebound of the vehicle body.

8. A device of the character described, comprising telescoping members adapted for attachment to the axle and the body frame respectively of a vehicle or the like, a stem carried by one of said members, means adapted for frictional binding engagement with the other of said members, a hollow wedge separate from the stem and freely surrounding the same, spiral springs inside and outside of said wedge and surrounding said stem so as to constitute a floating arrangement of said wedge between said stem and the inner telescoping member, said parts being so constructed and arranged as to effect operation of said friction means so as to prevent rebound of the vehicle body.

9. A device of the character described, comprising telescoping means adapted for attachment to the axle and the body frame respectively of a vehicle or the like, means adapted for frictional binding engagement with a part of said telescoping means, separate wedge means for automatically effecting operation of said frictional means so as to prevent rebound of the vehicle body, and means for supporting said wedge means directly upon the end of said inner telescoping means.

10. A device of the character described, comprising telescoping means adapted for attachment to the axle and the body frame respectively of a vehicle or the like, means adapted for frictional binding engagement with a part of said telescoping means, wedge means for automatically effecting operation of said frictional means so as to prevent rebound of the vehicle body, and means for supporting said wedge means directly upon the end of the inner telescoping means, said last named means serving also to limit the movement of said frictional means in one direction.

11. A device of the character described, comprising telescoping members adapted for attachment to the axle and the body frame respectively of a vehicle or the like, a stem carried by one of said members, means adapted for frictional binding engagement with the other of said members, separate wedge means for actuation of said friction means, said wedge means surrounding said stem and having a shoulder, a washer adapted to seat upon the end of the inner telescoping member and affording a seat for the shoulder of said wedge means, said parts being so constructed and arranged as to automatically effect operation of said friction means and thereby prevent rebound of the vehicle body.

12. A device of the character described, comprising telescoping members adapted for attachment to the axle and the body frame respectively of a vehicle or the like, a stem carried by one of said members, means adapted for frictional binding engagement with the other of said members, separate wedge means for actuation of said frictional means, said wedge means surrounding said stem and having a shoulder, a washer adapted to seat upon the end of the inner telescoping member and affording a seat for the shoulder of said wedge means and spring means tending normally to maintain said wedge means upon said seat, said parts being so constructed and arranged as to automatically effect operation of said frictional means and thereby prevent rebound of the vehicle body.

13. A device of the character described, comprising telescoping means adapted for attachment to the axle and the body frame respectively of a vehicle or the like, means adapted for frictional binding engagement with a part of said means, means for automatically effecting operation of said frictional means so as to prevent rebound of the vehicle body, and universal connecting means for attachment of said telescoping means to the axle and the vehicle body frame respectively, said connecting means including the cap having telescoping engagement with the end of a telescoping means, and means for maintaining said cap in position and for automatically taking up wear.

14. A device of the character described, comprising telescoping means adapted for attachment to the axle and the body frame respectively of a vehicle or the like, means adapted for frictional binding engagement with a part of said telescoping means, means for automatically effecting operation of said frictional means so as to prevent rebound of the vehicle body, and universal connecting means for attachment of said telescoping means to the axle and vehicle body frame respectively, said connecting means including a cap having telescoping engagement with the end of a telescoping means, and spring means for maintaining said cap in position for automatically taking up wear.

15. A device of the character described, comprising telescoping means adapted for attachment to the axle and the body frame respectively of a vehicle or the like, means adapted for frictional binding engagement with a part of said telescoping means, means including a floating wedge for automatically effecting operation of said friction means so as to prevent rebound of the vehicle body, and means for varying the binding action of said friction means.

16. A device of the character described, comprising telescoping members adapted for attachment to the axle and the body frame respectively of a vehicle or the like, a stem carried by one of said members, means adapted for frictional binding engagement with the other of said members, a hollow wedge separate from said stem and freely surrounding the same, spiral springs inside and outside of said wedge and surrounding said stem so as to constitute a floating arrangement of said wedge between said stem and the inner telescoping member, said parts being so constructed and arranged as to effect operation of said frictional means so as to prevent rebound of the vehicle body, and means for adjusting said stem so as to vary the combined action of the springs and thereby vary the gripping action of frictional means.

In testimony whereof I hereby affix my signature.

SOLOMON WISE.